(12) United States Patent
Kinugawa et al.

(10) Patent No.: US 9,062,631 B2
(45) Date of Patent: Jun. 23, 2015

(54) GAS SUPPLY APPARATUS FOR INTERNAL COMBUSTION ENGINE

(75) Inventors: Masumi Kinugawa, Okazaki (JP); Kohei Motoo, Toyohashi (JP); Munehisa Horibe, Chiryu (JP)

(73) Assignee: DENSO CORPORATION, Kariya (JP)

( * ) Notice: Subject to any disclaimer, the term of this patent is extended or adjusted under 35 U.S.C. 154(b) by 438 days.

(21) Appl. No.: 13/562,758

(22) Filed: Jul. 31, 2012

(65) Prior Publication Data

US 2013/0032123 A1 Feb. 7, 2013

(30) Foreign Application Priority Data

Aug. 1, 2011 (JP) .................. 2011-167989

(51) Int. Cl.
*F02M 23/00* (2006.01)
*F02D 21/02* (2006.01)
*F02D 21/06* (2006.01)

(52) U.S. Cl.
CPC ................ *F02M 23/00* (2013.01); *F02D 21/02* (2013.01); *F02D 21/06* (2013.01); *Y02T 10/146* (2013.01)

(58) Field of Classification Search
CPC ......... F02D 19/08; F02D 21/08; F02D 21/04; F02D 41/04; F02M 33/00; F02M 25/07
USPC .................. 123/443, 699, 531, 533, 585–588
See application file for complete search history.

(56) References Cited

FOREIGN PATENT DOCUMENTS

| JP | 08-254161 | 10/1996 |
|---|---|---|
| JP | H08-254161 A | * 10/1996 |
| JP | 2007-285281 | 11/2007 |
| JP | 4076433 | 2/2008 |
| JP | 2010-065609 | 3/2010 |
| JP | 2010-065609 A | * 3/2010 |
| JP | 2010-168927 | 8/2010 |
| JP | 2012-82802 | 4/2012 |
| JP | 2012-225213 | 11/2012 |

OTHER PUBLICATIONS

"1-1 Gas Separation Membrane Device", issued by National Center for Industrial Property Information and Training (2001), http//www.inpit.go.jp/katsuyo/archives00007.html.
Office Action (3 pages) dated Jun. 3, 2014, issued in corresponding Japanese Application No. 2011-167989 and English translation (7 pages).

* cited by examiner

*Primary Examiner* — Stephen K Cronin
*Assistant Examiner* — Xiao Mo
(74) *Attorney, Agent, or Firm* — Nixon & Vanderhye PC

(57) ABSTRACT

A straight port and a swirl port supply low-oxygen-concentration gas and high-oxygen-concentration gas into a combustion chamber of an engine such that high-level-oxygen-concentration gas and low-level-oxygen-concentration gas are formed from the high-oxygen-concentration gas and the low-oxygen-concentration gas in an adjacent region of the combustion chamber, which is adjacent to a fuel mist injected from an injection hole of a fuel injection valve. The high-level-oxygen-concentration gas is located in a corresponding area of the adjacent region, which is generally opposite from the fuel injection hole, and the low-level-oxygen-concentration gas is located in a remaining area of the adjacent region, which is other than the corresponding area of the adjacent region.

12 Claims, 9 Drawing Sheets

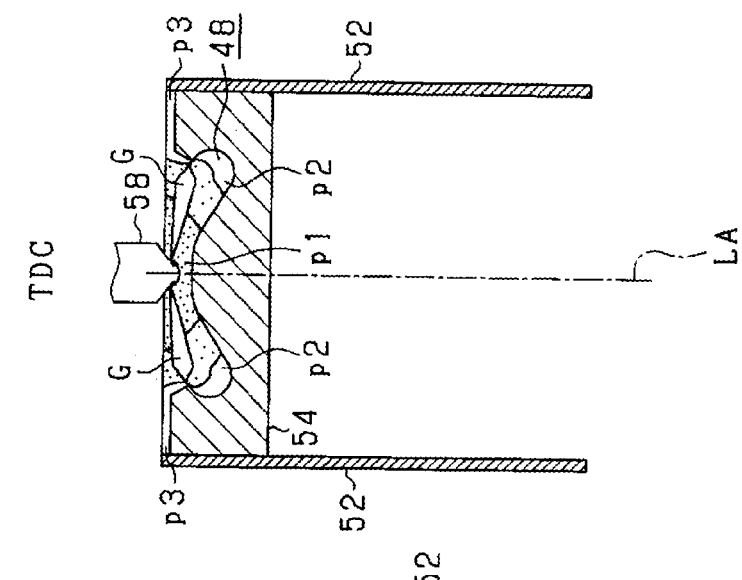
FIG. 6A 130°CA BTDC
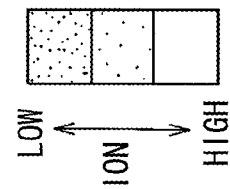
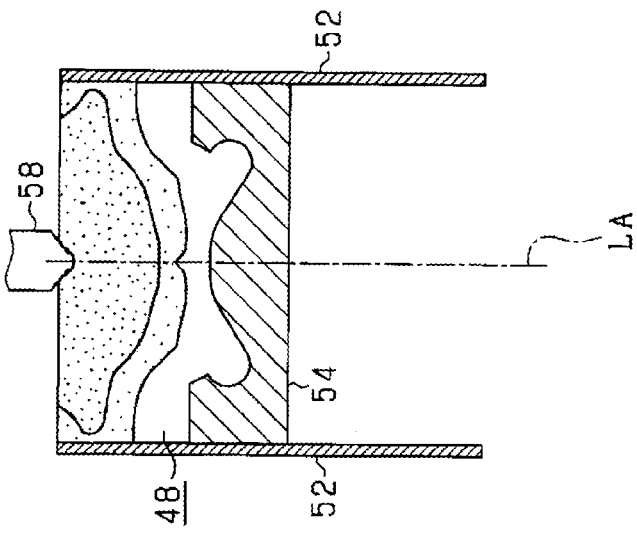
FIG. 6B 60°CA BTDC
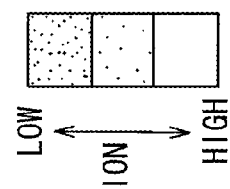
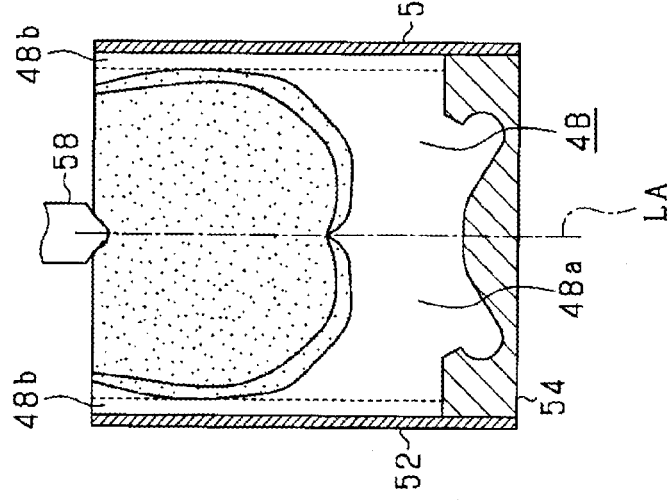
FIG. 6C TDC
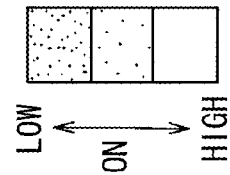

FROM INTERCOOLER     TO VACUUM PUMP     TO $N_2$ SURGE TANK

| ENGINE LOAD | LOW | HIGH |
|---|---|---|
| REGULATING VALVE | CLOSE | OPEN |
| $N_2$ CONTROL VALVE | CLOSE | OPEN |

GAS SUPPLY APPARATUS FOR INTERNAL COMBUSTION ENGINE

CROSS REFERENCE TO RELATED APPLICATION

This application is based on and incorporates herein by reference Japanese Patent Application No. 2011-167989 filed on Aug. 1, 2011.

TECHNICAL FIELD

The present disclosure relates to a gas supply apparatus for an internal combustion engine.

BACKGROUND

For example, JP4076433B2 and JP2007-285281A teach a technique of limiting emissions at an internal combustion engine of a direct injection type. Specifically, nitrogen-rich air (low-oxygen-concentration gas), which has a high content of nitrogen and is produced by removing a portion of oxygen from the atmospheric air, is supplied to a combustion chamber of the internal combustion engine. In this way, combustion of fuel at an outer peripheral portion of fuel mist, which is directly injected from a fuel injection valve into the combustion chamber, is slowed to reduce the combustion temperature and thereby to limit generation of the nitrogen oxide (NOx).

Although the above technique can limit the generation of the nitrogen oxide (NOx), the above technique may not appropriately limit generation of particulate matter (smoke). This is because of combustion of a high-fuel-concentration area of the fuel mist, which has a high fuel concentration, under shortage of the oxygen.

SUMMARY

The present disclosure addresses the above disadvantage.

According to the present disclosure, there is provided a gas supply apparatus for an internal combustion engine, which includes a fuel injection valve that is adapted to directly inject fuel into a combustion chamber of the internal combustion engine through at least one fuel injection hole of the fuel injection valve. The gas supply apparatus includes a supply arrangement that is adapted to supply high-oxygen-concentration gas, which has an oxygen concentration that is higher than an oxygen concentration of fresh air, and low-oxygen-concentration gas, which has an oxygen concentration that is lower than the oxygen concentration of the fresh air, into the combustion chamber such that at a time of injecting fuel mist from the at least one fuel injection hole of the fuel injection valve into the combustion chamber, high-level-oxygen-concentration gas, which has an oxygen concentration that is equal to or lower than the oxygen concentration of the high-oxygen concentration gas, and low-level-oxygen-concentration gas, which has an oxygen concentration that is lower than the oxygen concentration of the high-level-oxygen-concentration gas and is equal to or higher than the oxygen concentration of the low-oxygen-concentration gas, are formed from the high-oxygen-concentration gas and the low-oxygen-concentration gas in an adjacent region of the combustion chamber, which is adjacent to the fuel mist, wherein the high-level-oxygen-concentration gas is located in a corresponding area of the adjacent region, which is generally opposite from the at least one fuel injection hole of the fuel injection valve, while the fuel mist being held between the corresponding area of the adjacent region and the at least one fuel injection hole of the fuel injection valve, and the low-level-oxygen-concentration gas is located in a remaining area of the adjacent region, which is other than the corresponding area of the adjacent region, in which the high-level-oxygen-concentration gas is located.

According to the present disclosure, there is also provided a gas supply apparatus for an internal combustion engine, which includes a fuel injection valve that is adapted to directly inject fuel into a combustion chamber of the internal combustion engine through at least one fuel injection hole of the fuel injection valve. The gas supply apparatus includes a supply arrangement that is adapted to supply high-oxygen-concentration gas, which has an oxygen concentration that is higher than an oxygen concentration of fresh air, and low-oxygen-concentration gas, which has an oxygen concentration that is lower than the oxygen concentration of the fresh air, into the combustion chamber such that high-level-oxygen-concentration gas, which has an oxygen concentration that is equal to or lower than the oxygen concentration of the high-oxygen concentration gas, and low-level-oxygen-concentration gas, which has an oxygen concentration that is lower than the oxygen concentration of the high-level-oxygen-concentration gas and is equal to or higher than the oxygen concentration of the low-oxygen-concentration gas, are formed from the high-oxygen-concentration gas and the low-oxygen-concentration gas in the combustion chamber, wherein the low-level-oxygen-concentration gas is located in a surrounding area, which is adjacent to and surrounds the at least one fuel injection hole of the fuel injection valve in the combustion chamber, and the high-level-oxygen-concentration gas, is located in an outer area, which is on an outer side of the surrounding area, in which the low-level-oxygen-concentration gas is located.

BRIEF DESCRIPTION OF THE DRAWINGS

The drawings described herein are for illustration purposes only and are not intended to limit the scope of the present disclosure in any way.

FIGS. 6A to 6C are diagrams showing a distribution of nitrogen-rich gas and oxygen-rich gas in a combustion chamber for various operational states of a piston according to the first embodiment;

DETAILED DESCRIPTION

First Embodiment

A common rail system of a first embodiment of the present disclosure, which includes a multi-cylinder compression ignition internal combustion engine (diesel engine) provided with a control unit, will be described with reference to the accompanying drawings.

Figure 1:
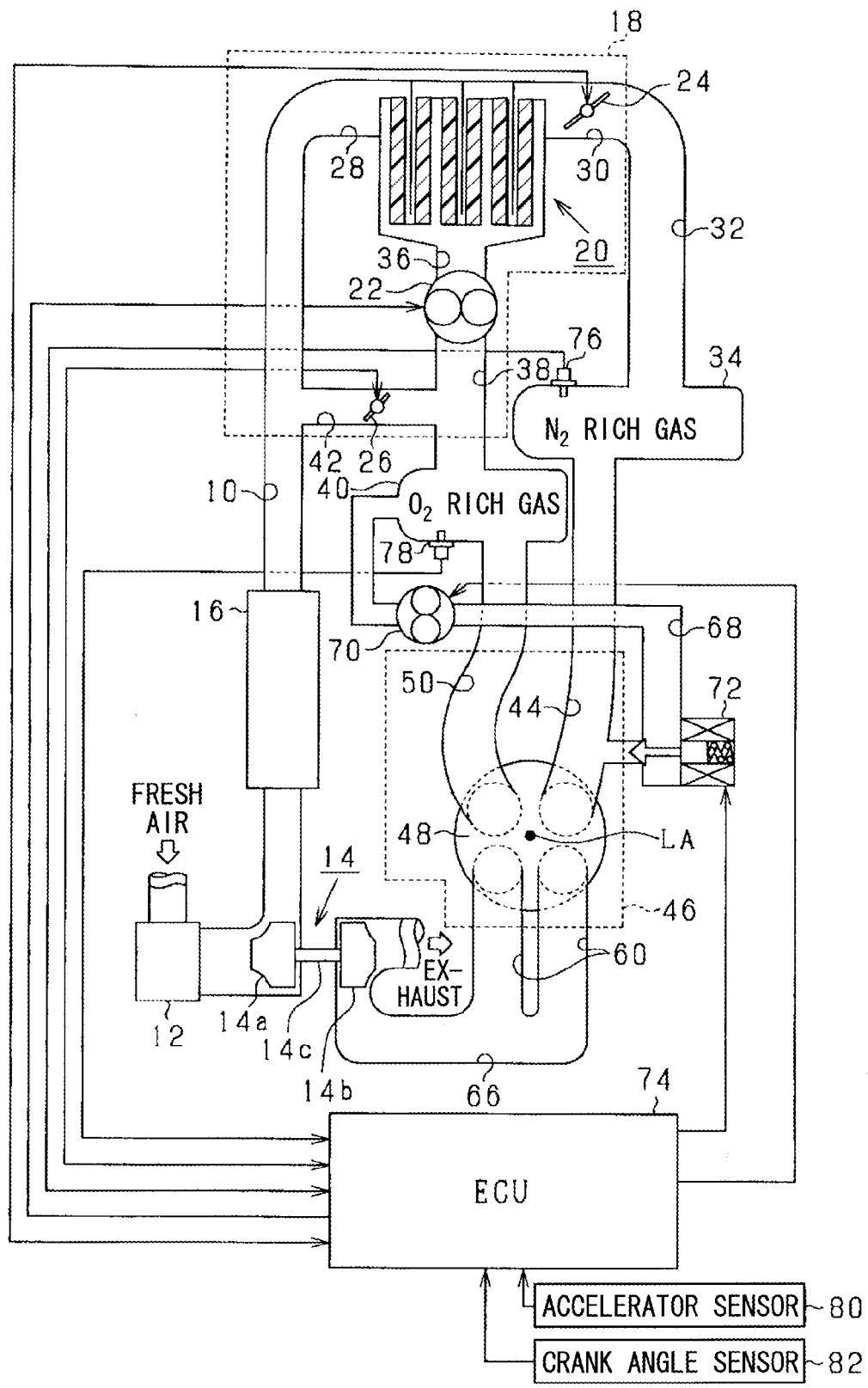
FIG. 1 is a diagram showing a structure of a system according to a first embodiment of the present disclosure.

FIG. 1 illustrates a structure of a system (combustion control system) of the present embodiment, which includes a gas supply control apparatus.

As shown in FIG. 1, an air cleaner 12 and an intercooler 16 are placed in this order from an upstream side in an intake air passage 10. The intercooler 16 cools air (fresh air, i.e., the atmospheric air) supercharged by a turbocharger 14.

The portion of the intake air passage 10 located on the downstream side of the intercooler 16 is connected to a nitrogen enriching device 18. The nitrogen enriching device 18 includes a separator 20, a vacuum pump 22, a nitrogen control valve 24 and an oxygen control valve 26. The nitrogen enriching device 18 has a function of producing a nitrogen-rich gas (serving as a low-oxygen-concentration gas), which has a lower oxygen concentration that is lower than an oxygen concentration of the fresh air, and an oxygen-rich gas (serving as a high-oxygen-concentration gas), which has a higher oxygen concentration that is higher than the oxygen concentration of the fresh air, by utilizing a difference in permeability (a permeation rate or a transmission rate) among the respective gases (gas species) contained in the fresh air at the time of passing through a separating member 20a of the separator 20.

Specifically, a portion of the intake air passage 10, which is located on a downstream side of the intercooler 16, is connected to an inlet 28 of the separator 20. A nitrogen outlet 30 of the separator 20, through which the nitrogen-rich gas is outputted from the separator 20, is connected to a surge tank (hereinafter referred to as a nitrogen surge tank) 34 through a nitrogen supply passage 32 to supply the nitrogen-rich gas to the nitrogen surge tank 34. The nitrogen control valve 24 is placed in the nitrogen supply passage 32 to adjust a passage cross-sectional area of the nitrogen supply passage 32. The nitrogen control valve 24 is an electronically-controlled valve, an opening degree of which is adjusted by an undepicted actuator (e.g., a DC motor).

An oxygen outlet 36 of the separator 20, through which the oxygen-rich gas is outputted from the separator 20, is connected to a surge tank (hereinafter referred to as an oxygen surge tank) 40 through an oxygen supply passage 38 to supply the oxygen-rich gas to the oxygen surge tank 40.

The vacuum pump 22 is provided in the oxygen supply passage 38. The vacuum pump 22 is an electronically-controlled device and depressurizes an oxygen outlet 36 side space of the separator 20 to maintain a negative pressure thereof. The vacuum pump 22 has a function of adjusting a degree of depressurization of the oxygen outlet 36 side space of the separator 20.

A portion of the oxygen supply passage 38, which is located on a downstream side of the vacuum pump 22 and on an upstream side of the oxygen surge tank 40, is connected to the portion of the intake air passage 10, which is located on the downstream side of the intercooler 16, through a fresh air supply passage 42. The oxygen control valve 26 is placed in the fresh air supply passage 42 to adjust a passage cross-sectional area of the fresh air supply passage 42. Similar to the nitrogen control valve 24, the oxygen control valve 26 is an electronically-controlled valve, an opening degree of which is adjusted by an undepicted actuator (e.g., a DC motor).

Now, the separator 20 of the nitrogen enriching device 18 will be described in detail with reference to FIG. 2.

Figure 2:
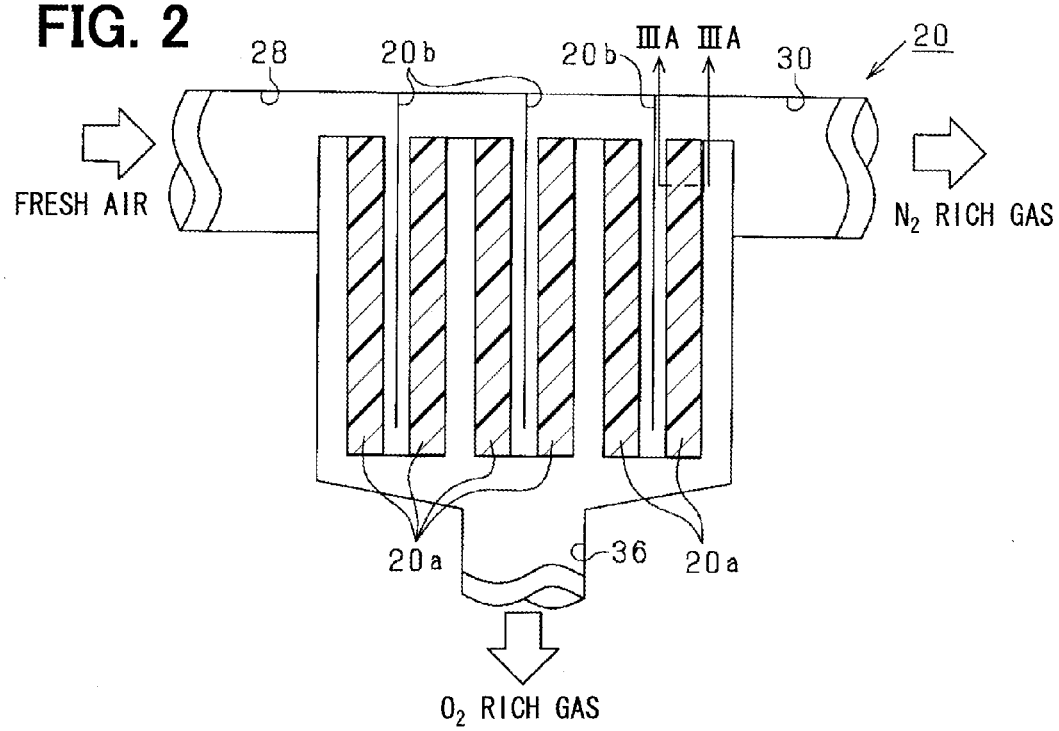
FIG. 2 is a diagram showing a separator according to the first embodiment.

As shown in FIG. 2, the separator 20 includes a plurality of separating members 20a (membrane modules) and a plurality of partition walls 20b. In the separator 20, the inlet 28 is connected to the nitrogen outlet 30 through a meandering passage (maze passage), which is formed by the separating members 20a and the partition walls 20b. The separating members 20a are interposed between the inlet 28 and the oxygen outlet 36.

Figure 3A:
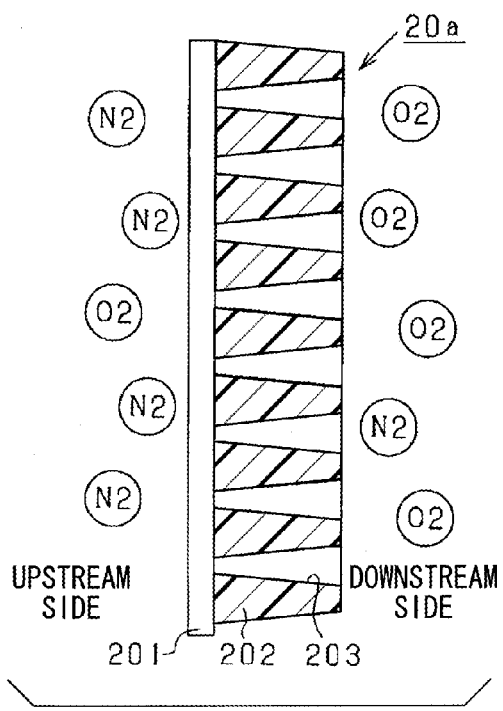
FIG. 3A is a cross-sectional view of a separating member of the separator taken along line IIIA-IIIA in FIG. 2.
Figure 3B:
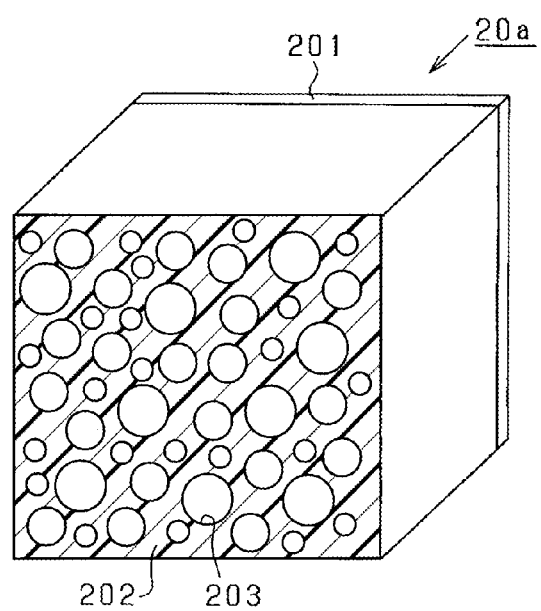
FIG. 3B is a partial enlarged view of a portion of the separating member shown in FIG. 3A.

In the present embodiment, each separating member 20a is made of an oxygen enrichment membrane. Now, the oxygen enrichment membrane will be described with reference to FIGS. 3A and 3B. FIG. 3A is a cross-sectional view of the separating member 20a taken along line IIIA-IIIA in FIG. 2, and FIG. 3B is a partial enlarged view of a portion of the separating member 20a.

As shown in FIG. 3A, the oxygen enrichment membrane (the separating member 20a) is a member, which has a membrane main body 201 and a support body 202. Specifically, the membrane main body 201 is a member, which has a thickness in a range of about several tens to several hundreds of nanometers and has a function of conducting oxygen molecules at a rate that is faster than that of nitrogen molecules through the membrane main body 201. This point will be described in terms of a permeability coefficient that is an index indicating a permeation rate (transmission rate) of the gas through the membrane. The membrane main body 201 is the member, which is constructed such that the permeability coefficient Qo of the oxygen molecules is higher than the permeation coefficient Qn of the nitrogen molecules.

When the permeability coefficient is increased, a flow quantity of the gas, which flows through the membrane main body per unit time, is increased. Furthermore, the permeation rate is increased when a pressure difference between the high pressure side (the inlet 28 side) and the low pressure side (the oxygen outlet 36 side) is increased. Furthermore, in the present embodiment, the oxygen enrichment membrane has a separation factor "Qo/Qn" of the oxygen relative to the nitrogen in the fresh air equal to or higher than 3.

The support body 202 is a member that limits a damage of the membrane main body 201 by the pressure difference between the inlet 28 side and the oxygen outlet 36 side and has a thickness of several tens of micrometers. With reference to FIG. 3B, the support body 202 has a plurality of wedge-shaped holes 203, each of which is in a range of several tens to several hundreds of nanometers, and which are communicated one after another in a thickness direction of the support body 202 to rapidly conduct the permeated gas, which has passed through the membrane main body 201, toward the oxygen outlet 36 side.

Referring back to FIG. 2, the pressure at the oxygen outlet 36 side (downstream side) of the separating member 20a is made lower than the pressure at the meandering passage side (upstream side) by the vacuum pump 22. When the fresh air, which is introduced into the inside of the separator 20 through the inlet 28, passes through the meandering passage formed by the separating members 20a and the partition walls 20b, the oxygen, which is contained in the fresh air, passes through the separating members 20a and flows to the oxygen outlet 36 side in the larger amount, which is larger than that of the nitrogen, which is contained in the fresh air. As a result, the above-mentioned oxygen-rich gas flows out of the oxygen outlet 36, and the above-mentioned nitrogen-rich gas flows out of the nitrogen outlet 30.

Figure 4:
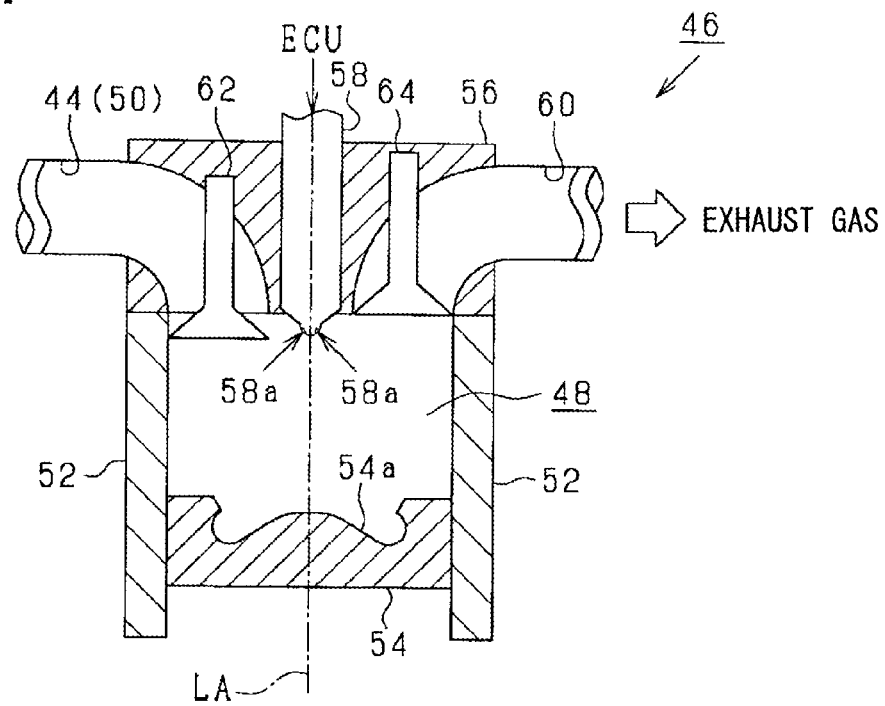
FIG. 4 is a schematic diagram showing a portion of an internal combustion engine according to the first embodiment.

Referring back to FIG. 1, the nitrogen surge tank 34 is connected to the combustion chamber 48 (the combustion chamber of one cylinder is shown as an example in FIG. 1) of each cylinder of the engine 46 through a straight port (serving as a first intake port) 44 and a corresponding intake valve 62 (see FIG. 4). The straight port 44 is configured to conduct the intake air linearly and discharges it into the combustion chamber 48. In the following description of the present embodiment, the intake air refers to at least one of the fresh air, the oxygen-rich gas and the nitrogen-rich gas.

The oxygen surge tank 40 is connected to the combustion chamber 48 through a swirl port (serving as a second intake port) 50 and a corresponding intake valve 62 (see FIG. 4). The swirl port 50 is configured to form a swirl flow in the combustion chamber 48.

Next, a structure around the engine 46 of the present embodiment will be described with reference to FIG. 4. Here, it should be noted that FIG. 4 shows only one of the cylinders of the engine 46.

The engine 46 is a four-stroke reciprocating multi-cylinder compression ignition internal combustion engine, which has one combustion cycle (720 degrees CA) of an intake stroke, a compression stroke, an expansion stroke and an exhaust stroke. The engine 46 has cylinders 52, pistons 54 and a cylinder head 56.

Specifically, a generally cylindrical combustion chamber 48 is defined by each cylinder 52, an upper surface (a surface opposed to the cylinder head 56) of the corresponding piston 54, and the cylinder head 56. A cavity 54a is formed in the upper surface of the piston 54. In the present embodiment, the cavity 54a is configured as follows. Specifically, in the cavity 54a, a recess is formed in the upper surface of the piston 54, and this recess is concentrically bulged to have its peak at a central axis LA (indicated by a dot-dash line in FIG. 4) of the combustion chamber 48 such that a height of the bulge increases in a radial direction of the piston 54 toward the central axis LA. The central axis LA of the combustion chamber 48 is an axis, which extends through a center of a bore of the cylinder 52 in a reciprocating direction (a top-to-bottom direction of FIG. 4) of the piston 54.

A fuel injection valve 58, which is electromagnetically-driven and has a plurality of fuel injection holes 58a, is provided to the combustion chamber 48 of each cylinder of the engine 46. Specifically, the fuel injection valve 58 is placed such that the injection holes 58a are located at the upper side (cylinder head 56 side) of the combustion chamber 48 and are exposed around the central axis LA of the combustion chamber 48. High-pressure fuel (light oil) is supplied from an undepicted pressure accumulation vessel (common rail) to the fuel injection valve 58, and the high pressure fuel is injected from the fuel injection valve 58 into the combustion chamber 48 through the injection holes 58a. Specifically, the fuel injection valve 58 injects fuel mist toward an end portion of the cavity 54a at the upper surface of the piston 54 when the piston 54 is placed at a location adjacent to a top dead center of the piston 54 in the compression stroke.

At each cylinder 52 of the engine 46, each of the straight port 44 and the swirl port 50, which serve as the intake ports, is opened or closed by the corresponding one of the two intake valves 62. Furthermore, each of the exhaust ports 60 is opened or closed by a corresponding one of two exhaust valves 64. In this instance, the two intake valves 62 are opened and closed at the same timing (the same opening timing and closing timing), and the two exhaust valves 64 are opened and closed at the same timing (the same opening timing and closing timing). When the intake valves 62 are opened, the intake air is introduced into the combustion chamber 48. Then, the introduced intake air and the fuel mist, which is injected from the fuel injection valve 58, undergo a combustion process in the combustion chamber 48. That is, the intake air and the fuel are combusted in the combustion chamber 48 and are discharged from the combustion chamber 48 as the exhaust gas through the exhaust ports 60 upon opening of the exhaust valves 64.

Referring back to FIG. 1, the turbocharger 14 is placed between the intake air passage 10 and an exhaust passage 66, which is connected with the exhaust ports 60. The turbocharger 14 includes an intake air compressor 14a, an exhaust turbine 14b and a rotatable shaft 14c. The intake air compressor 14a is placed in the intake air passage 10, and the exhaust turbine 14b is placed in the exhaust passage 66. The rotatable shaft 14c connects between the intake air compressor 14a and the exhaust turbine 14b. Specifically, the exhaust turbine 14b is rotated by the energy of the exhaust gas, which flows in the exhaust passage 66. Then, the rotational energy of the exhaust turbine 14b is transmitted to the intake air compressor 14a through the rotatable shaft 14c, so that the intake air is supercharged by the intake air compressor 14a. The turbocharger 14 can be of, for example, a type (a variable vane type), which can adjust a boost pressure of the intake air.

The oxygen surge tank 40 is connected to the straight port 44 through a conduit 68. More specifically, the oxygen surge tank 40 is connected to a portion of the straight port 44, which is located adjacent to the combustion chamber 48. A compressor 70 and a gas injection valve (serving as an interrupt-supply device or an interrupt-supply means) 72 are provided in the conduit 68 in this order from the oxygen surge tank 40 side. The compressor 70 is a device, which pressurizes the oxygen-rich gas supplied from the oxygen surge tank 40 and supplies the pressurized oxygen-rich gas to the gas injection valve 72. The gas injection valve 72 is an electromagnetically-driven valve, which injects the pressurized oxygen-rich gas into the straight port 44. In the present embodiment, the gas injection valve 72 is a normally-closed type, which is opened upon energization of an electromagnetic solenoid of the gas injection valve 72 and is closed upon deenergization of the electromagnetic solenoid.

An electronic control unit (ECU) 74 is a control unit (also referred to as a control device or a controller) that controls various actuators, which are required for various control operations of the common rail system. The ECU 74 receives signals from various sensors, which include a nitrogen pressure sensor 76, an oxygen pressure sensor 78, an accelerator sensor 80 and a crank angle sensor 82. The nitrogen pressure sensor 76 senses the pressure in the nitrogen surge tank 34. The oxygen pressure sensor 78 senses the pressure in the oxygen surge tank 40. The accelerator sensor 80 senses the amount of manipulation, i.e., the amount of depression of an accelerator pedal by a driver, i.e., a user (accelerator manipulation amount). The crank angle sensor 82 senses a rotational angle of an undepicted output shaft (crankshaft) of the engine 46. The ECU 74 executes combustion control operations of the engine 46, which include a fuel injection control operation of the fuel injection valve 58 and a gas production process control operation, based on these input signals.

The fuel injection control operation is executed by the ECU 74 as follows. Specifically, the ECU 74 computes a required torque (demand torque) of the engine 46 based on an engine rotational speed, which is sensed based on an output of the crank angle sensor 82, and the accelerator manipulation amount, which is sensed based on an output value of the accelerator sensor 80. In this instance, normally, the required torque of the engine 46 is increased when the accelerator manipulation amount (the amount of depression of the accelerator pedal) is increased. Then, the ECU 74 computes a command value of the fuel injection valve 58 based on the required torque of the engine 46. Thereafter, the ECU 74 executes the energization of the solenoid of the fuel injection valve 58 based on the command value. Thereby, the corresponding quantity of fuel, which corresponds to the command value, is injected from the fuel injection valve 58 in a period (e.g., the timing at or adjacent to the timing of reaching the top dead center in the compression stroke), which is from a later half of the compression stroke to a first half of the expansion stroke.

The gas production process is a process of adjusting a flow quantity and an oxygen concentration of the nitrogen-rich gas, which is supplied to the nitrogen surge tank 34, and a flow quantity and an oxygen concentration of the oxygen-rich gas, which is supplied to the oxygen surge tank 40, to corresponding desired values, respectively, through the control operation of the energization of the vacuum pump 22, the nitrogen control valve 24 and the oxygen control valve 26.

Specifically, the flow quantity of the nitrogen-rich gas is increased when the opening degree of the nitrogen control valve 24 is increased. The oxygen concentration of the nitrogen-rich gas is decreased when the opening degree of the nitrogen control valve 24 is reduced or when the pressure of the oxygen outlet 36 (the oxygen supply passage 38 side) is reduced (i.e., when the pressure difference between the upstream side and the downstream side of the separating member 20a is increased). The flow quantity of the oxygen-rich gas is increased when the opening degree of the oxygen control valve 26 is increased, or when the pressure of the oxygen outlet 36 side is reduced. The oxygen concentration of the oxygen-rich gas is increased when the pressure of the oxygen outlet 36 side (the oxygen supply passage 38 side) is reduced (i.e., when the pressure difference between the upstream side and the downstream side of the separating member 20a is increased), or when the opening degree of the oxygen control valve 26 is reduced. In the present embodiment, in a case where the oxygen concentration of the fresh air is about 21%, when the gas production process is executed, the oxygen concentration of the nitrogen-rich gas is adjusted in a range of 5 to 20%, and the oxygen concentration of the oxygen-rich gas is adjusted in a range of 22 to 30%.

The ECU 74 also executes an estimating process of estimating a quantity of the intake air, which flows into each intake port (each of the straight port 44 and the swirl port 50), based on the measurement values of the nitrogen pressure sensor 76 and the oxygen pressure sensor 78. Furthermore, the ECU 74 executes an adjusting process of adjusting the estimated intake air quantity to a target value by controlling the energization of the nitrogen control valve 24, the oxygen control valve 26 and the vacuum pump 22.

In the present embodiment, with the above-discussed system structure, the distribution (location) of the oxygen-rich gas and the distribution (location) of the nitrogen-rich gas in the combustion chamber 48 are appropriately adjusted to limit the generation of the nitrogen oxide (NOx) and the smoke at the engine 46. This point will be described below.

Figure 5A:
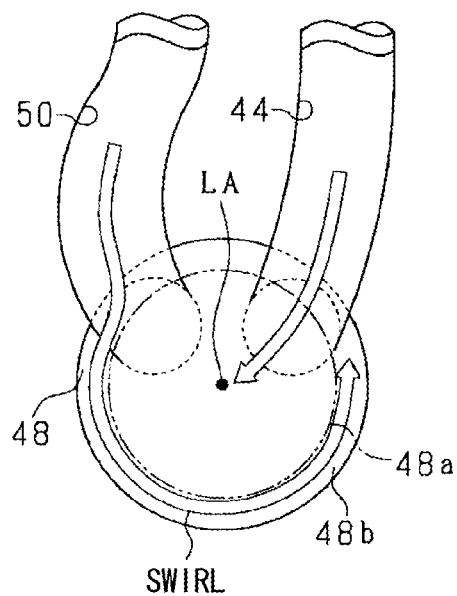
FIG. 5A is a diagram showing a straight port and a swirl port connected to a combustion chamber according to the first embodiment.

First of all, with reference to FIG. 5A, the supply of the intake air from the straight portion 44 to the combustion chamber 48 and the supply of the intake air from the swirl port 50 to the combustion chamber 48 will be described. In FIG. 5A, the gas injection valve 72 and the exhaust ports 60 are not depicted for the sake of simplicity.

With reference to FIG. 5A, a center region 48a and an outer peripheral region 48b of the combustion chamber 48 are defined as follows. The center region 48a is a cylindrical region (a region surrounded by a dot-dot-dash line in FIG. 5A), which has a radius that is smaller than a radius of the combustion chamber 48 (a radius of the bore of the cylinder 52) and extends in a direction of the central axis LA, i.e., extends along the central axis LA. The outer peripheral region 48b is a remaining annular region, which is other than the center region 48a in the combustion chamber 48 and is located on an outer side of the center region 48a in the radial direction. In the present embodiment, a central axis of the center region 48a, which is configured into the cylindrical form, coincides with the central axis LA of the combustion chamber 48.

The intake air is supplied from the straight port 44 into the center region 48a as a generally linear flow (a generally straight flow) of the intake air. The intake air is supplied from the swirl port 50 into the outer peripheral region 48b as a swirl flow of the intake air.

Next, an interrupting supply process of the oxygen-rich gas of the present embodiment will be described with reference to FIG. 5B. This process is a process of energizing the gas injection valve 72 to supply the oxygen-rich gas from the straight port 44 to the combustion chamber 48 before the time of executing the supply of the nitrogen-rich gas from the straight port 44 to the combustion chamber 48 during the valve opening period of the intake valves 62.

Figure 5B:
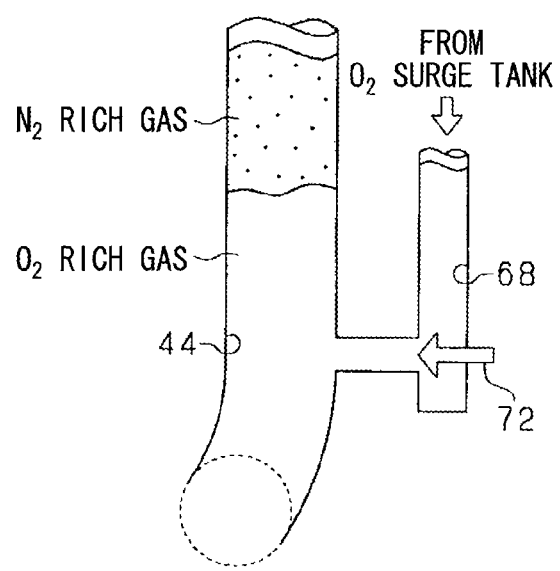
FIG. 5B is a diagram showing a portion of the straight port and a portion of a conduit connected thereto according to the first embodiment.

Specifically, as shown in FIG. 5B, the oxygen-rich gas is pressurized and supplied to an adjacent region of the straight port 44, which is adjacent to the combustion chamber 48 (the intake valve 62), through the valve opening of the gas injection valve 72 during a valve closing period of the intake valves 62, so that the oxygen-rich gas is distributed in the adjacent region of the straight port 44, which is adjacent to the combustion chamber 48.

When the interrupting supply process of the oxygen-rich gas is executed, the oxygen-rich gas is distributed (filled) into the adjacent region of the straight port 44, which is adjacent to the combustion chamber 48, and the nitrogen-rich gas is distributed (filled) in an upstream side region of the straight portion 44, which is adjacent to and is located on an upstream side of the adjacent region of the straight portion 44. Thereafter, when the intake valves 62 are opened in the intake stroke, the oxygen-rich gas and then nitrogen-rich gas are discharged in this order from the straight port 44 into the center region 48a of the combustion chamber 48.

Next, there will be described changes in the behavior (movement) of the gases in the combustion chamber 48 after the supplying of the intake air (the oxygen-rich gas and the nitrogen-rich gas) into the combustion chamber 48 in the above described manner. Specifically, FIG. 6A shows the distribution of the gases at the valve closing timing of the intake valves 62 (130 degrees CA before the top dead center of the compression stroke). FIG. 6B shows the distribution of the gases at 60 degrees CA before the top dead center of the compression stroke. FIG. 6C shows the distribution of the gases at the top dead center of the compression stroke. Here, it should be noted that each of FIGS. 6A to 6C shows a cross-sectional view of the combustion chamber 48 of the engine 46 taken along a plane that is parallel to and extends along the central axis LA of the combustion chamber 48. Furthermore, the gas distributions of FIGS. 6A to 6C are obtained through a computer-aided engineering (CAE) analysis performed by the inventors of the present application.

First of all, as shown in FIG. 6A, a low-level-oxygen-concentration gas is located around the injection holes of the fuel injection valves 58 in the combustion chamber 48, and a high-level-oxygen-concentration gas is placed radially outward of the low-level oxygen concentration gas in the combustion chamber 48. Specifically, the high-level-oxygen-concentration gas is placed in a lower portion of the combustion chamber 48 (a portion adjacent to the upper surface of the piston 54) in the center region 48a, and the low-level-oxygen-concentration gas is placed in an upper portion of the combustion chamber 48 in the center region 48a.

Here, the high-level-oxygen-concentration gas is defined as gas that has the oxygen concentration, which is equal to or lower than the oxygen concentration of the oxygen-rich gas (the high-oxygen-concentration gas). Furthermore, the low-level-oxygen-concentration gas is defined as gas that has the oxygen concentration, which is lower than the oxygen concentration of the high-level-oxygen-concentration gas and is equal to or higher than the oxygen concentration of the nitrogen-rich gas (low-oxygen-concentration gas). In the state where the oxygen concentration of the high-level-oxygen-concentration gas is kept higher than the oxygen concentration of the low-level-oxygen-concentration gas, the oxygen concentration of the high-level-oxygen-concentration gas may possibly become lower than the oxygen concentration of the fresh air, or the oxygen concentration of the low-level-oxygen-concentration gas may possibly become higher than the oxygen concentration of the fresh air. This is due to the following reason. That is, after the supplying of the nitrogen-rich gas and the oxygen-rich gas into the combustion chamber 48 through the straight port 44 and the swirl port 50, which serve as the intake ports, the oxygen-rich gas and the nitrogen-rich gas are mixed with each other due to the flow of the gases and/or the upward movement of the piston 54. The oxygen concentration in the corresponding region of the combustion chamber 48, in which the high-level-oxygen-concentration gas is placed, and/or the oxygen concentration in the corresponding region of the combustion chamber 48, in which the low-level-oxygen-concentration gas is placed, are not necessarily uniform.

In the present embodiment, two-third (⅔) of the volume of the combustion chamber 48 is filled with the low-level-oxygen-concentration gas.

Next, as shown in FIG. 6B, in response to the upward movement of the piston 54, the high-level-oxygen-concentration gas and the low-level-oxygen-concentration gas are compressed in the top-to-bottom direction without being substantially mixed with each other.

Then, as shown in FIG. 6C, at the injection timing of the fuel injection valve 58, the low-level-oxygen-concentration gas, which has the low oxygen concentration, largely occupies an adjacent area p1, which is adjacent to the central axis LA in the cavity 54a, and the high-level-oxygen-concentration gas largely occupies a bottom area p2 of the cavity 54a and an area p3, which is surrounded by the upper surface of the piston 54 and the cylinder head 56.

In the state where the above distribution of the gases is formed, when the fuel mist G is injected from the fuel injection valve 58, the high-level-oxygen-concentration gas is located in the areas p2, p3 of the adjacent region (i.e., the region adjacent to the fuel mist G in the combustion chamber 48), which are generally opposite from the fuel injection holes 58a, while the fuel mist G being held between the areas p2, p3 of the adjacent region and the fuel injection holes 58a. Also, at this time, the low-level-oxygen-concentration gas is located in the other remaining area (the area p1) of the adjacent region that is other than the areas p2, p3 of the adjacent region, in which the high-level-oxygen-concentration gas is located. Then, when the compression-ignition combustion (auto-ignition and combustion) of the fuel mist starts, the combustion of an outer peripheral portion of the fuel mist G, which is located adjacent to the low-level-oxygen-concentration gas, becomes slow to cause a decrease of the combustion temperature. Thereby, generation of the nitrogen oxide (NOx) is limited. Furthermore, the high-level-oxygen-concentration gas, which is located at a distal end portion (a portion adjacent to the upper surface of the piston 54) of the fuel mist G, promotes the combustion of the distal end portion of the fuel mist. Thereby, generation of the smoke is limited. Furthermore, at this time, smoke is once generated by combustion of an inside portion of the fuel mist G, which has a high fuel concentration. However, at a late stage of the combustion period, the thus generated smoke reaches the bottom area p2 of the cavity 54a and the area p3 surrounded by the upper surface of the piston 54 and the cylinder head 56. Then, combustion of the smoke is promoted by the high-level-oxygen-concentration gas. Therefore, the generation of both of the nitrogen oxide (NOx) and the smoke can be limited.

Here, it is desirable that a pressure ratio of the nitrogen-rich gas and the oxygen-rich gas supplied into the combustion chamber 48 (the pressure of the nitrogen-rich gas/the pressure of the oxygen-rich gas) is kept in a range of about 0.7 to 1.3. This will be implemented by a process of controlling the energization of the nitrogen control valve 24 and the oxygen control valve 26 in such a manner that the above pressure ratio, which is computed based on the measurement values of the nitrogen pressure sensor 76 and the oxygen pressure sensor 78, is controlled to a target value of the pressure ratio, which is set in the above range of 0.7 to 1.3. In this way, the substantial mixing between the nitrogen-rich gas and the oxygen-rich gas is limited in the combustion chamber 48, and the distribution of the gases shown in FIG. 6C can be appropriately achieved to limit the generation of the nitrogen oxide (NOx) and the smoke.

Furthermore, in the case where the interrupting supply process of the oxygen-rich gas is not performed for the combustion chamber 48, which is formed in the above described manner (formed to have the above configuration of the cavity 54a) according to the present embodiment, it may possibly be difficult to have the distribution of the gases shown in FIG. 6A. This is due to the fact of that when the low-level-oxygen-concentration gas is placed in the lower portion of the combustion chamber 48 in the center region 48a, the distribution of the gases shown in FIG. 6C cannot be implemented through the compression of the combustion chamber 48.

The present embodiment provides the following advantages.

(1) The nitrogen-rich gas is supplied to the center region 48a of the combustion chamber 48 through the straight port 44, and the oxygen-rich gas is supplied to the outer peripheral region 48b of the combustion chamber 48 through the swirl port 50. In this stage, the oxygen-rich gas is supplied through the straight port 44 by the interrupting supply process of the oxygen-rich gas discussed above before the time of supplying the nitrogen-rich gas through the straight port 44. Therefore, the generation of both of the nitrogen oxide (NOx) and the smoke can be appropriately limited.

Furthermore, with the above combustion method, it is possible to limit the amount of nitrogen oxide (NOx) generated at the engine 46 at the time of advancing the ignition timing. Therefore, the thermal efficiency of the engine 46 can be increased by the advancement of the ignition timing (the fuel injection timing). Thereby, it is possible to limit an increase in the fuel consumption, which is required per unit torque of the engine 46.

(2) The system has the nitrogen enriching device 18 discussed above. Thereby, the nitrogen-rich gas and the oxygen-rich gas can be appropriately produced from the fresh air.

In the first embodiment, the nitrogen supply passage 32, the nitrogen surge tank 34, the straight port 44, the oxygen supply passage 38, the oxygen surge tank 40 and the swirl port 50 cooperate together to form a supply arrangement (also referred to as a supply means) that is adapted to supply the nitrogen-rich gas (low-oxygen-concentration gas) and the oxygen-rich gas (high-oxygen-concentration gas) into the combustion chamber 48.

Second Embodiment

A second embodiment of the present disclosure will be described mainly with respect to features, which are different from the first embodiment.

Figure 7:
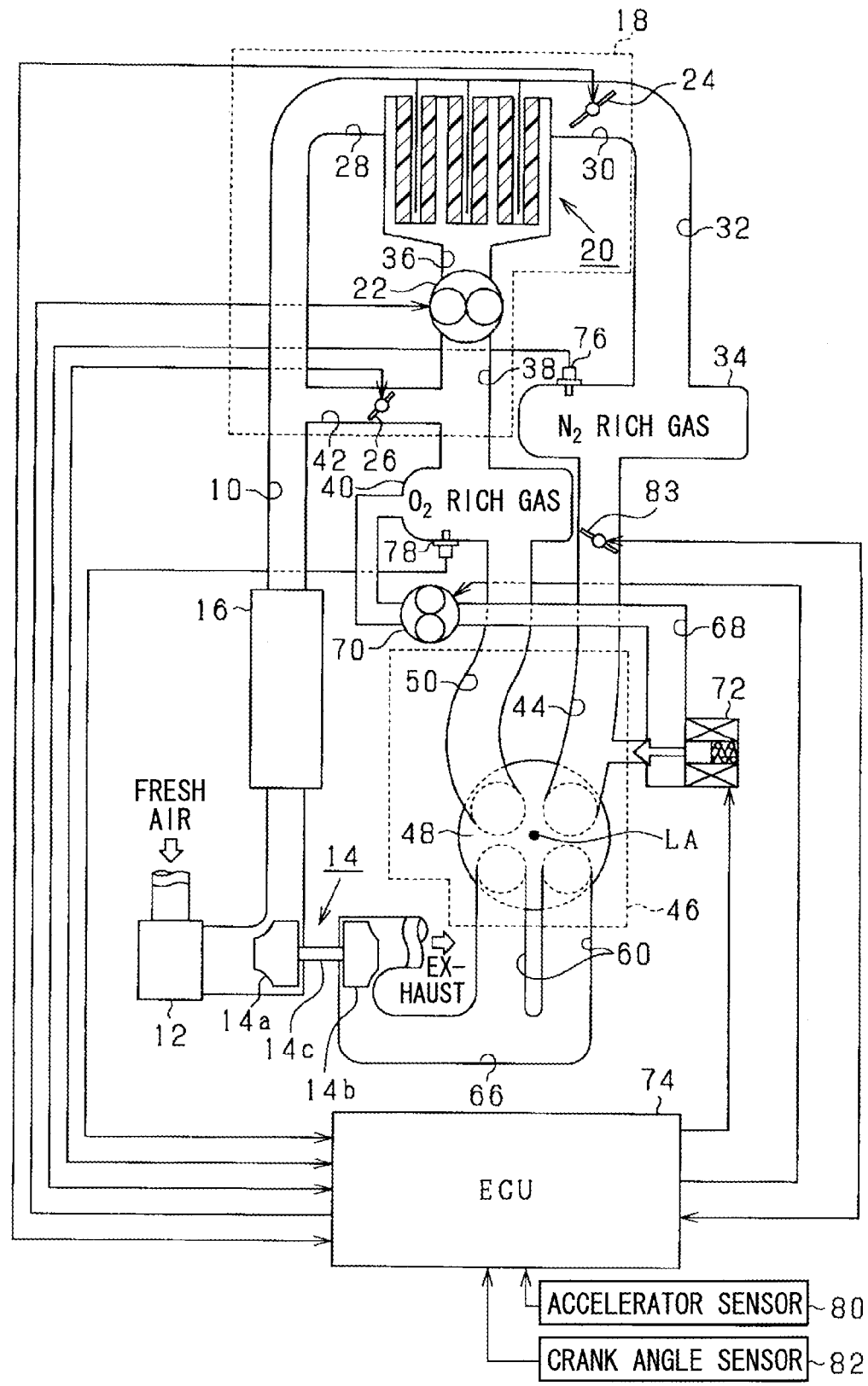
FIG. 7 is a diagram showing a structure of a system according to a second embodiment of the present disclosure.

FIG. 7 is a diagram showing a structure of the system of the present embodiment. In FIG. 7, the components, which are similar to those of the first embodiment shown in FIG. 1, will be indicated by the same reference numerals.

As shown in FIG. 7, an intake air control valve (serving as a passage cross-sectional area adjusting device or a passage cross-sectional area adjusting means) 83 is placed in a portion of the straight port 44, which is located on the upstream side of the connection of the straight port 44, to which the conduit 68 is connected. The intake air control valve 83 adjusts a passage cross-sectional area of the straight port 44. The intake air control valve 83 is an electronically-controlled valve, an opening degree of which is adjusted by an undepicted actuator (e.g., a DC motor). Energization of the intake air control valve 83 is controlled by the ECU 74.

Next, the interrupting supply process of the oxygen-rich gas of the present embodiment will be described with reference to FIGS. 8 to 9C.

In the interrupting supply process of the oxygen-rich gas according to the present embodiment, the oxygen-rich gas is injected from the gas injection valve 72 into the straight port 44, and thereby the mixing of the injected oxygen-rich gas and the nitrogen-rich gas located on the upstream side of the oxygen-rich gas can be appropriately limited.

Figure 8:
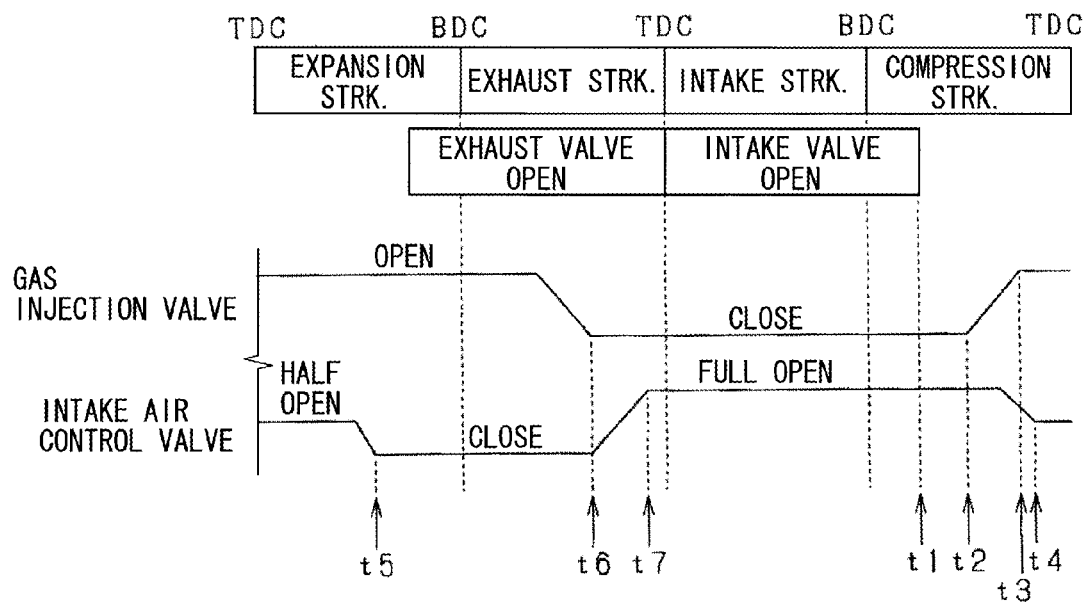
FIG. 8 is a diagram showing operations of a gas injection valve and an intake air control valve according to the second embodiment.
Figure 9A:
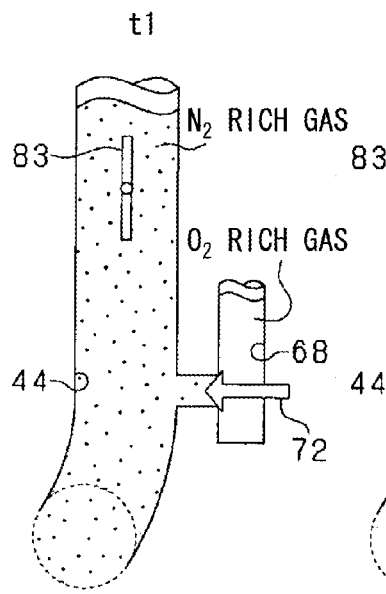
FIGS. 9A to 9C are diagrams showing various operational states, respectively, of the gas injection valve and the intake air control valve according to the second embodiment.
Figure 9B:
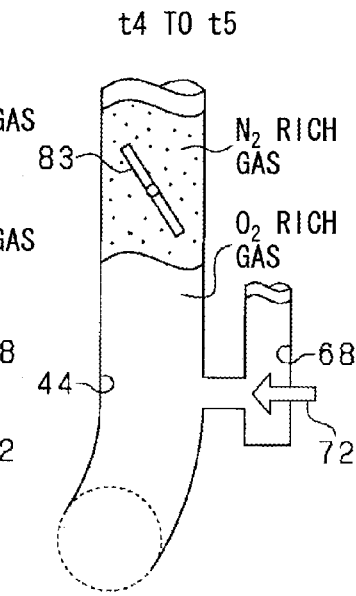
Figure 9C:
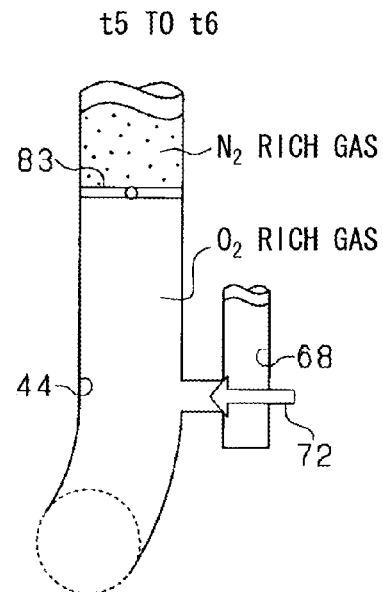

Specifically, as indicated in FIG. 8, at a time point t1, at which the intake valves 62 are closed in the compression stroke, the gas injection valve 72 is closed, and the intake air control valve 83 is fully opened (the passage cross-sectional area of the straight port 44 being maximum) (see FIG. 9A).

Thereafter, a valve opening command of the gas injection valve 72 is outputted at a time point t2. Then, the gas injection valve 72 is opened at a time point t3, so that the injection of the oxygen-rich gas into the straight port 44 is started. In the present embodiment, the gas injection valve 72 has a response time period of equal to or less than 5 milliseconds, which is from the time point of outputting the valve opening command of the gas injection valve 72 to the time point of opening the gas injection valve 72.

When the gas injection valve 72 is opened, the passage cross-sectional area of the straight port 44 is maintained to a value, which is smaller than the passage cross-sectional area of the straight port 44 at the time of full opening of the intake air control valve 83. Specifically, the opening degree of the intake air control valve 83 is kept to the half open. In this way, the nitrogen-rich gas is pushed backward toward the upstream side of the intake air control valve 83 by the oxygen-rich gas, which is injected from the gas injection valve 72 (see FIG. 9B). The half open of the intake air control valve 83 is set for the purpose of limiting the mixing between the oxygen-rich gas and the nitrogen-rich gas in the straight port 44. Specifically, when the intake air control valve 83 is fully opened in the state where the oxygen-rich gas is injected from the gas injection valve 72, the oxygen-rich gas, which is injected into the straight port 44, tends to move toward the upstream side of the intake air control valve 83 to cause the mixing between the oxygen-rich gas and the nitrogen-rich gas.

Thereafter, the intake air control valve 83 is closed at a time point t5, at which the majority of the nitrogen-rich gas is pushed backward toward the upstream side in the straight port 44. Thereby, the oxygen-rich gas is trapped in the space between the intake valve 62 and the intake air control valve 83 in the straight port 44 (see FIG. 9C).

Thereafter, at a time point t6, the gas injection valve 72 is closed to stop the injection of the oxygen-rich gas into the straight port 44, and the full opening command is outputted to the intake air control valve 83. Then, the intake air control valve 83 is fully opened at a time point t7. In the present embodiment, the intake air control valve 83 has a response time period of equal to or less than 5 milliseconds, which is from the time point of outputting the full valve opening command of the intake air control valve 83 to the time point of fully opening the intake air control valve 83.

In the present embodiment, when the interrupting supply process of the oxygen-rich gas is executed in the above-described manner, the mixing between the oxygen-rich gas and the nitrogen-rich gas in the straight port 44 can be appropriately limited.

Third Embodiment

A third embodiment of the present disclosure will be described mainly with respect to features, which are different from the second embodiment in view of FIG. 10.

Figure 10:
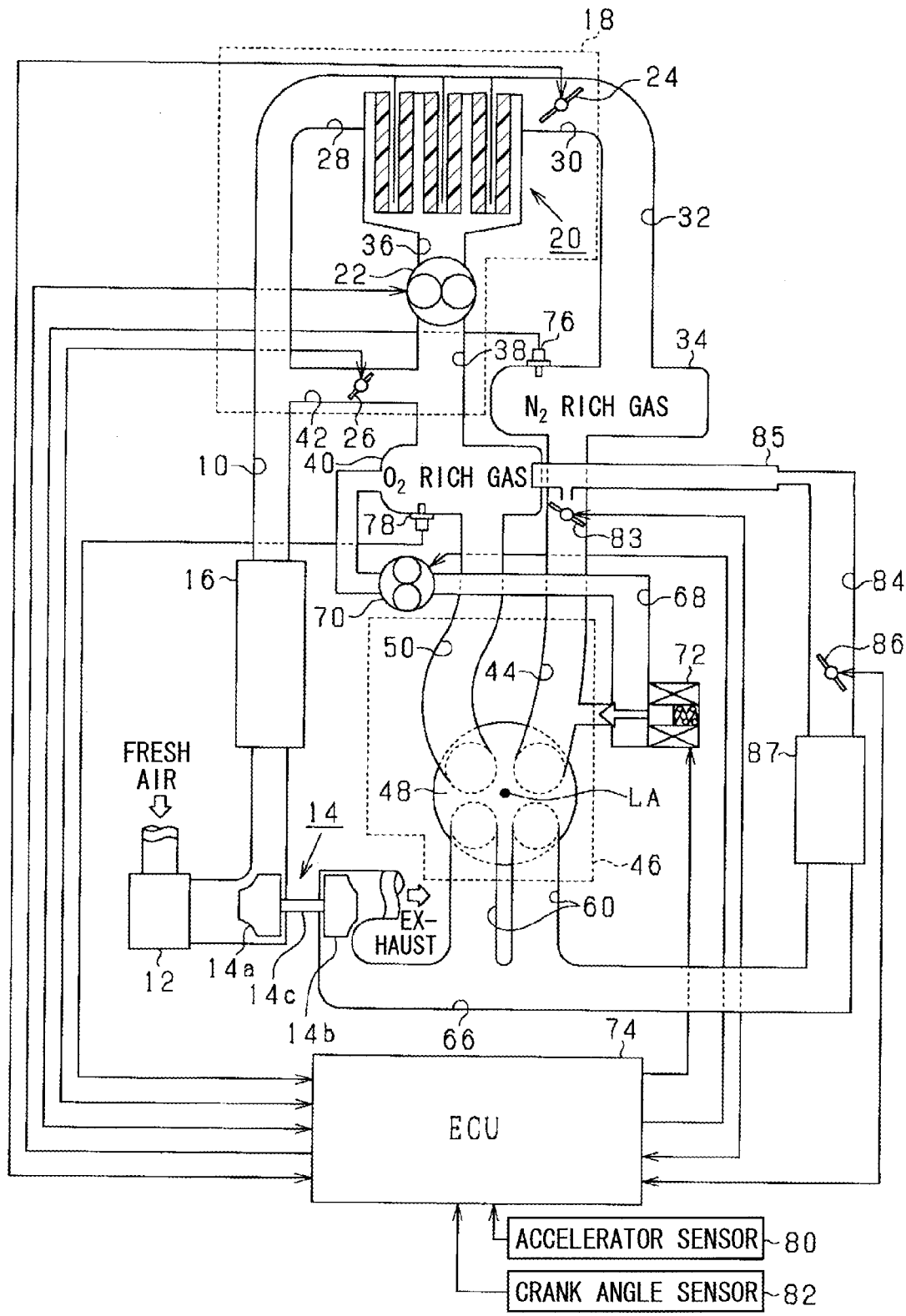
FIG. 10 is a diagram showing a structure of a system according to a third embodiment of the present disclosure.

FIG. 10 is a diagram showing a structure of the system of the present embodiment. In FIG. 10, the components, which are similar to those of the second embodiment shown in FIG. 7, will be indicated by the same reference numerals.

As shown in FIG. 10, an upstream portion of the exhaust passage 66, which is located on the upstream side of the turbocharger 14, is connected to an upstream portion of the straight port 44, which is located on the upstream side of the straight port 44, through an exhaust gas recirculation (EGR) passage 84 and an EGR distributor 85.

An EGR valve 86 and an EGR cooler 87 are provided in the EGR passage 84. The EGR valve 86 is an electronically-controlled valve and adjusts a passage cross-sectional area of the EGR passage 84. According to an opening degree of the EGR valve 86, a portion of the exhaust gas (hereinafter referred to as external EGR gas), which is discharged into the exhaust passage 66, is supplied to the straight port 44 of each cylinder through the EGR distributor 85 after being cooled by the EGR cooler 87. The EGR distributor 85 is a member, which uniformly distributes the external EGR gas to the straight port 44 of each cylinder. In the following description of the present embodiment, the intake air refers to at least one of the fresh air, the oxygen-rich gas, the nitrogen-rich gas and the external EGR gas.

The ECU 74 determines whether the required quantity of the nitrogen-rich gas, which is set according to the operational state of the engine 46, is larger than an actually producible nitrogen-rich gas quantity $\alpha$, which can be actually produced with the nitrogen enriching device 18. When it is determined that the required quantity of the nitrogen-rich gas is larger than the actually producible nitrogen-rich gas quantity $\alpha$, the ECU 74 determines that the nitrogen-rich gas quantity is insufficient. Then, the ECU 74 executes an EGR supply process by controlling the energization of the EGR valve 86 to supply the external EGR gas, which corresponds to the amount of shortage of the nitrogen-rich gas, to the straight port 44. This process is a process, which avoids disabling of the appropriate placement of the nitrogen-rich gas that is required to limit the generation of both of the nitrogen oxide (NOx) and the smoke.

Similar to the first embodiment, it is desirable to set a pressure difference of generally zero (0) between the pressure of the mixture (mixture gas) of the nitrogen-rich gas and the external EGR gas and the pressure of the oxygen-rich gas supplied to the combustion chamber 48. Here, the pressure of the mixture (mixture gas) of the nitrogen-rich gas and the external EGR gas can be obtained based on a measurement of a pressure sensor, which is provided in a portion of the straight port 44, which is located on a downstream side of a connection of the straight portion 44 that is connected to the EGR distributor 85.

As discussed above, according to the present embodiment, even in the case where the amount of the nitrogen-rich gas produced by the nitrogen enriching device 18 becomes short, i.e., insufficient, the amount of shortage of the nitrogen-rich gas can be compensated by executing the EGR supply process discussed above. Therefore, the generation of both of the nitrogen oxide (NOx) and the smoke can be appropriately limited.

In the present embodiment, the EGR passage 84, the EGR distributor 85, the EGR valve 86 and the EGR cooler 87 cooperate together to form an EGR device (also referred to as an EGR means), which is controlled by the ECU 74.

Fourth Embodiment

A fourth embodiment of the present disclosure will be described mainly with respect to features, which are different from the third embodiment, with reference to FIG. 11.

Figure 11:
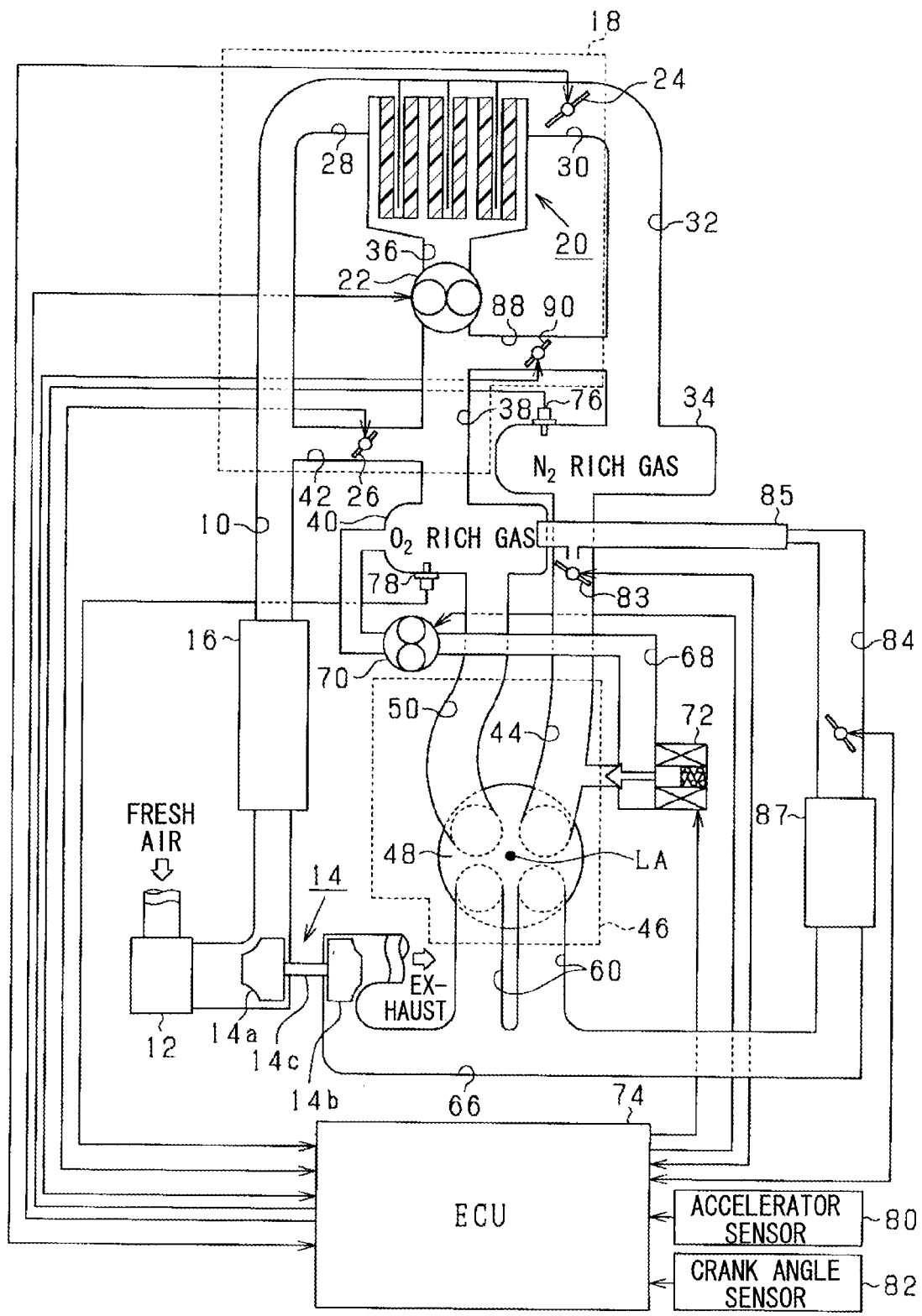
FIG. 11 is a diagram showing a structure of a system according to a fourth embodiment of the present disclosure.

FIG. 11 is a diagram showing a structure of the system of the present embodiment. In FIG. 11, the components, which are similar to those of the third embodiment shown in FIG. 10, will be indicated by the same reference numerals.

As shown in FIG. 11, the nitrogen supply passage (serving as a first supply passage) 32 and the oxygen supply passage (serving as a second supply passage) 38 are connected with each other through a communication conduit (serving as a communication passage) 88. A communication control valve (serving as a first passage cross-sectional area adjusting device or a first passage cross-sectional area adjusting means) 90 is placed in the communication conduit 88 to adjust a passage cross-sectional area of the communication conduit 88. Similar to the nitrogen control valve 24 discussed above, the communication control valve 90 is an electronically-controlled valve, an opening degree of which is adjusted by an undepicted actuator (e.g., a DC motor).

The ECU 74 closes the communication control valve 90 when it is determined that the engine 46 is in a normal operational state (i.e., an operational state, which is other than a state of rapidly increasing the load of the engine 46 and a state of a high load of the engine 46). In this instance, it may be determined whether the load of the engine 46 is rapidly increased by, for example, determining whether a rate of increase of the required torque of the engine 46 is equal to or larger than a predetermined value. Furthermore, it may be determined whether the load of the engine 46 is in the state of the high load by, for example, determining whether the required torque of the engine 46 is equal to or higher than a predetermined torque.

In the case where the engine 46 is determined to be in the state of rapidly increasing the load or the state of the high load, the ECU 74 executes an oxygen concentration increasing process by controlling the energization of the nitrogen control valve 24, the oxygen control valve (serving as a second passage cross-sectional area adjusting device or a second passage cross-sectional area adjusting means) 26 and the communication control valve 90 to increase the amount of oxygen supplied to the combustion chamber 48. Specifically, the ECU 74 closes the nitrogen control valve 24 (disconnecting between the nitrogen outlet 30 and the nitrogen surge tank 34 by the nitrogen control valve 24) and opens the oxygen control valve 26 and the communication control valve 90. This process is a process that limits the increase of the smoke generated at the engine 46.

Specifically, in the state where the load of the engine 46 is rapidly increased at the time of, for example, shifting the operational state of the engine 46 from the low load operational state to the high load operational state (e.g., the time of accelerating the vehicle), when the degree of the supercharging is increased by the turbocharger 14, the influence of such an increase on the pressure of the intake air supplied to the combustion chamber 48 is delayed (the delay of the intake air). Due to the delay of the intake air, the quantity of the intake air supplied to the engine 46 becomes short with respect to the fuel injection quantity of the fuel injection valve 58 that corresponds to the required torque of the engine 46. In such a case, the fuel mist is combusted in the state of the oxygen shortage, so that the amount of smoke generated from the engine 46 may possibly be increased.

Therefore, when the above-described process of the present embodiment is executed to supply the mixture (mixture gas) of the oxygen-rich gas and the fresh air from both of the straight port 44 and the swirl port 50 to the combustion chamber 48, the oxygen concentration of the intake air supplied to the combustion chamber 48 is increased. Thereby, the increase of the amount of smoke generated due the delay of the intake air is limited.

The generation of the smoke is limited through the execution of the above-described process in the state where the load of the engine 46 is high due to the following reason. That is, the above-described process increases the oxygen concentration of the entire combustion chamber 48, so that afterburning of the smoke in the combustion chamber 48 is promoted to limit the generation of the smoke.

As discussed above, in the present embodiment, when the above oxygen concentration increasing process is executed, the generation of the smoke at the time of, for example, rapid increase of the load of the engine 46 can be appropriately limited. Furthermore, the generation of the smoke can be limited while minimizing the decrease in the fuel injection quantity of the fuel injection valve 58. Therefore, it is possible to avoid the occurrence of shortage of the torque generated from the engine 46 at the time of accelerating the vehicle.

Fifth Embodiment

A fifth embodiment of the present disclosure will be described mainly with respect to features, which are different from the first embodiment in view of FIG. 12.

Figures 12, 13:
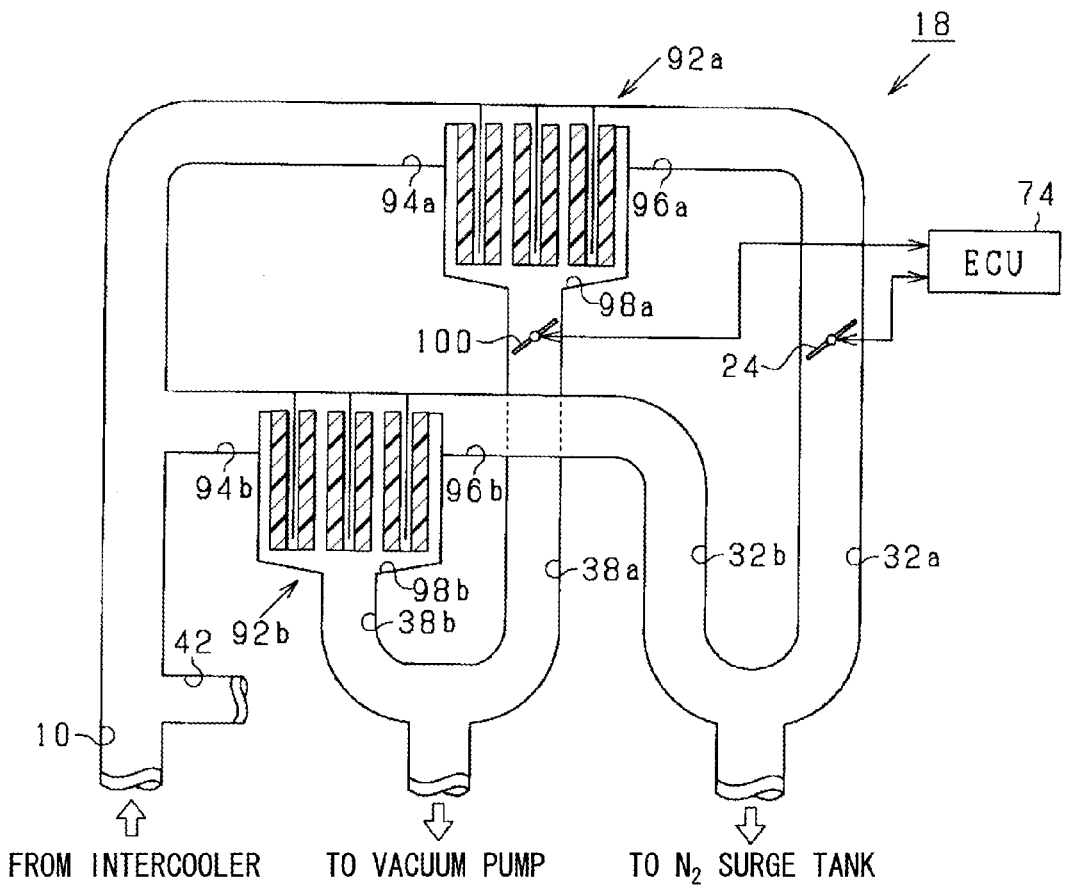
FIG. 12 is a diagram showing separators according to a fifth embodiment of the present disclosure.
FIG. 13 is a diagram showing operational states of a nitrogen enriching device according to the fifth embodiment.

FIG. 12 mainly shows a plurality of separators of the nitrogen enriching device 18 of the present embodiment.

Specifically, as shown in FIG. 12, the nitrogen enriching device 18 includes a first separator 92a and a second separator 92b. The structures of these separators 92a, 92b are the same as the structure of the separator 20 of the first embodiment.

The portion of the intake air passage 10, which is located on the downstream side of the fresh air supply passage 42, is connected to an inlet (first inlet) 94a of the first separator 92a. A nitrogen outlet (first nitrogen outlet) 96a of the first separator 92a, from which the nitrogen-rich gas flows out, is connected to the nitrogen surge tank 34 through a first nitrogen supply passage 32a.

An oxygen outlet (first oxygen outlet) 98a of the first separator 92a, from which the oxygen-rich gas flows out, is connected to the vacuum pump 22 through a first oxygen supply passage 38a. A regulating valve 100, which has a function similar to that of the nitrogen control valve 24, is placed in a portion of the first oxygen supply passage 38a, which is located on the upstream side of the vacuum pump 22.

A portion of the intake air passage 10, which is located on the downstream side of the fresh air supply passage 42, is connected to an inlet (second inlet) 94b of the second separator 92b. A nitrogen outlet (second nitrogen outlet) 96b of the second separator 92b, from which the nitrogen-rich gas flows out, is connected to a portion of the first nitrogen supply passage 32a, which is located on the downstream side of the nitrogen control valve 24, through a second nitrogen supply passage 32b.

An oxygen outlet (second oxygen outlet) 98b of the second separator 92b, from which the oxygen-rich gas flows out, is connected to a portion of the first oxygen supply passage 38a, which is located on the upstream side of the vacuum pump 22 and is on the downstream side of the regulating valve 100, through a second oxygen supply passage 38b.

The ECU 74 executes a process of controlling the energization of the nitrogen control valve 24 and the regulating valve 100 to change the number of the separator(s) in use, which is used in the production of the oxygen-rich gas and the nitrogen-rich gas based on the load (the required torque) of the engine 46.

Specifically, as shown in FIG. 13, when it is determined that the load of the engine 46 is in the low level, both of the regulating valve 100 and the nitrogen control valve 24 are closed. In this way, the fresh air is not supplied to the first separator 92a, and thereby the oxygen-rich gas and the nitrogen-rich gas are not produced by the first separator 92a. That is, the total surface area of the oxygen enrichment membranes, which is used in the production of the oxygen-rich gas and the nitrogen-rich gas, is reduced, and the negative pressure on the downstream side of the oxygen enrichment membranes of the second separator 92b is increased. Thus, there is produced the oxygen-rich gas, which has the higher oxygen concentration that is higher than that of the case where the first and second separators 92a, 92b are both used.

In contrast, when it is determined that the load of the engine 46 is in the high level, both of the nitrogen control valve 24 and the regulating valve 100 are opened. In this way, the large quantity of the oxygen-rich gas can be appropriately produced by using the first and second separators 92a, 92b.

The ECU 74 may determine whether the load of the engine 46 is in the low level based on a result of determination of, for example, whether the engine 46 is operated at the low rotational speed and the low load and/or a result of determination of, for example, whether a quantity of fresh air, which flows in the intake air passage 10, is smaller than a predetermined value. Furthermore, the ECU 74 may determine whether the load of the engine 46 is in the high level based on a result of determination of, for example, whether the engine 46 is operated at the middle rotational speed and the middle load and/or a result of determination of, for example, whether a quantity of fresh air, which flows in the intake air passage 10, is equal to or larger than the predetermined value discussed above.

As discussed above, according to the present embodiment, the number of the used separator(s) of the nitrogen enriching device 18 is changed based on the load of the engine 46, so that the oxygen-rich gas and the nitrogen-rich gas, quantities of which correspond to the operational state of the engine 46, can be provided. That is, there is an improved degree of freedom for setting the flow quantity and the oxygen concentration of the nitrogen-rich gas as well as the flow quantity and the oxygen concentration of the oxygen-rich gas based on the operational state of the engine 46.

In the fifth embodiment, the first nitrogen supply passage 32a, the second nitrogen supply passage 32b, the nitrogen surge tank 34, the straight port 44, the first oxygen supply passage 38a, the second oxygen supply passage 38b, the oxygen surge tank 40 and the swirl port 50 cooperate together to form a supply arrangement that is adapted to supply the nitrogen-rich gas (low-oxygen-concentration gas) and the oxygen-rich gas (high-oxygen-concentration gas) into the combustion chamber 48.

Furthermore, in the fifth embodiment, the ECU 74, the nitrogen control valve 24 and the regulating valve 100 cooperate together to serve as a control arrangement that is adapted to adjust the number of separators 92a, 92b in use, which are selected from the plurality of separators 92a, 92b and are used to produce the high-oxygen-concentration gas and the low-oxygen-concentration gas.

The above embodiments may be modified as follows.

In each of the above embodiments, the separating member of the nitrogen enriching device 18 is made of the oxygen enrichment membrane. However, the present disclosure is not limited to this. For example, the separating member may be made of a bundle of hollow fibers of polymer membrane (hollow fiber membrane) that is made of, for example, polyimide resin. Even in such a case, the oxygen-rich gas and the nitrogen-rich gas can be produced by using the difference in the permeability (transmission rate) among the respective gases (gas species) contained in the fresh air relative to the hollow fibers.

Furthermore, the method of producing the oxygen-rich gas and the nitrogen-rich gas is not limited to the method, which uses the difference in the permeability (the permeation rate or the transmission rate) among the respective gases (gas species) contained in the fresh air relative to the membrane. For example, such a method may be a method using a pressure swing adsorption (PSA), which separates the gases by using a difference in affinity among the respective gases (gas species) contained in the fresh air relative to an adsorbent material.

The location of the fuel injection valve and the number of the fuel injection valve(s) discussed in the respective embodiments are mere examples and are not limited to those discussed in the respective embodiments discussed above. For example, the fuel injection valve may be arranged such that the injection holes may open at a location, which is substantially spaced from the central axis LA in the combustion chamber, and/or more than one fuel injection valves (a plurality of fuel injection valves) may be provided. Even in such a case, as long as the high-level-oxygen-concentration gas and the low-level-oxygen-concentration gas are placed around the injected fuel mist, which is injected from the fuel injection valve(s), in a manner similar to the one discussed in the above embodiments, the reduction of the nitrogen oxide (NOx) and the smoke can be expected.

In the first embodiment, the gas injection valve 72 and the conduit 68 may be eliminated, if desired. In such a case, the shape of the cavity, which is formed in the piston 54, is different from the cavity 54a of the first embodiment. Even in such a case, the oxygen concentration distributions of FIGS. 6A to 6C can be implemented as long as the nitrogen-rich gas, which is supplied from the straight port 44 into the combustion chamber 48, and the oxygen-rich gas, which is supplied from the swirl port 50 into the combustion chamber 48, are not mixed in the center region 48a at the lower portion of the combustion chamber 48. Therefore, the generation of both of the nitrogen oxide (NOx) and the smoke can be limited.

In the third embodiment, the external EGR gas, which is supplied from the EGR distributor, may be solely used as the low-oxygen-concentration gas. In such a case, the nitrogen control valve 24 is closed.

In the third embodiment, it is possible to execute a process of supplying the external EGR gas in place of the low-oxygen-concentration gas under the state where the amount of the oxygen-rich gas is increased by closing the nitrogen control valve 24, and the sufficient amount of the external EGR gas is available. This process is considered to be effective in a state where the load of the engine 46 is high, and the amount of oxygen and the amount of the low-oxygen concentration gas, which need to be supplied to the combustion chamber 48, are increased.

In the fifth embodiment, the number of the separators of the nitrogen enriching device 18 may be increased to three or more.

In each of the above embodiments, the straight port 44 is used as a supply means (as a part of the supply arrangement) for supplying the oxygen-rich gas to the center region 48a of the combustion chamber 48. However, the present disclosure is not limited to this. For example, the supply means (the part of the supply arrangement) for supplying the oxygen-rich gas may be formed as an injection valve, which has an injection hole(s) that opens at the upper portion of the combustion chamber 48 and is placed at a location adjacent to the central axis LA of the combustion chamber 48. In such a case, an injection time period of such an injection valve may be set be in the middle to the later-half of the valve opening period of the intake valves in the intake stroke.

In the fourth embodiment, the oxygen concentration increasing process is executed in the case where the load of the engine 46 is high. However, the present disclosure is not limited to this. For example, the oxygen concentration increasing process may be executed in a state where the warming-up of the engine 46 is not yet completed. In such a case, the combustion state can be stabilized through the increase of the oxygen concentration of the intake air.

In the oxygen concentration increasing process of the fourth embodiment, there may be executed a process of increasing the opening degree of the nitrogen control valve 24. This is due to the fact that the increase in the opening degree of the oxygen control valve 26 and the increase in the opening degree of the communication control valve 90 largely contribute to the increase in the amount of oxygen supplied to the combustion chamber 48 in the oxygen concentration increasing process.

Furthermore, any one or more of the components of any one or more of the above embodiments may be combined with the components of any other one of the above embodiments within a scope and spirit of the present disclosure.

Additional advantages and modifications will readily occur to those skilled in the art. The present disclosure in its broader terms is therefore not limited to the specific details, representative apparatus, and illustrative examples shown and described.

What is claimed is:

1. A gas supply apparatus for an internal combustion engine, which includes a fuel injection valve that is adapted to directly inject fuel into a combustion chamber of the internal combustion engine through at least one fuel injection hole of the fuel injection valve, the gas supply apparatus comprising:
   a supply arrangement that is adapted to supply high-oxygen-concentration gas, which has an oxygen concentration that is higher than an oxygen concentration of fresh air, and low-oxygen-concentration gas, which has an oxygen concentration that is lower than the oxygen concentration of the fresh air, into the combustion chamber such that at a time of injecting fuel mist from the at least one fuel injection hole of the fuel injection valve into the combustion chamber, high-level-oxygen-concentration gas, which has an oxygen concentration that is equal to or lower than the oxygen concentration of the high-oxygen concentration gas, and low-level-oxygen-concentration gas, which has an oxygen concentration that is lower than the oxygen concentration of the high-level-oxygen-concentration gas and is equal to or higher than the oxygen concentration of the low-oxygen-concentration gas, are formed from the high-oxygen-concentration gas and the low-oxygen-concentration gas in an adjacent region of the combustion chamber, which is adjacent to the fuel mist, wherein:
   the high-level-oxygen-concentration gas is located in a corresponding area of the adjacent region, which is generally opposite from the at least one fuel injection hole of the fuel injection valve, while the fuel mist being held between the corresponding area of the adjacent region and the at least one fuel injection hole of the fuel injection valve, and the low-level-oxygen-concentration gas is located in a remaining area of the adjacent region, which is other than the corresponding area of the adjacent region, in which the high-level-oxygen-concentration gas is located;
   the supply arrangement includes a first intake port and a second intake port, which are adapted to supply the low-oxygen-concentration gas and the high-oxygen-concentration gas, respectively, into the combustion chamber;
   the first intake port is adapted to supply the low-oxygen-concentration gas into a center region of the combustion chamber, in which a central axis of the combustion chamber is located and which extends in a direction of the central axis;
   the second intake port is adapted to supply the high-oxygen-concentration gas into an outer peripheral region of the combustion chamber, which is located on an outer side of the center region and is other than the center region;
   the gas supply apparatus further comprises an interrupt-supply device that is adapted to supply the high-oxygen-concentration gas into the first intake port to supply the high-oxygen-concentration gas into the combustion chamber through the first intake port before a time of supplying the low-oxygen-concentration gas into the combustion chamber through the first intake port.

2. The gas supply apparatus according to claim 1, wherein:
   the interrupt-supply device is adapted to inject the high-oxygen-concentration gas into a portion of the first intake port;

the gas supply apparatus further comprising:
- a passage cross-sectional area adjusting device that is adapted to adjust a passage cross-sectional area of an upstream side portion of the first intake port, which is located on an upstream side of the portion of the first intake port, into which the high-oxygen-concentration gas is injected from the interrupt-supply device; and
- a controller that controls the passage cross-sectional area adjusting device and the interrupt-supply device; and
- the controller drives the passage cross-sectional area adjusting device to reduce the passage cross-sectional area of the upstream side portion of the first intake port and drives the interrupt-supply device to inject the high-oxygen-concentration gas during a valve closing period of an intake valve, during which the intake valve closes the first intake port.

3. The gas supply apparatus according to claim 1, further comprising a separator, which has a separating member and to which the fresh air is supplied, wherein:
- the separator is adapted to supply gas of the fresh air, which is supplied to the separator and is transmitted through the separating member of the separator, as the high-oxygen-concentration gas and to supply the rest of the fresh air, which is other than the high-oxygen-concentration gas, as the low-oxygen-concentration gas; and
- the supply arrangement is adapted to supply the high-oxygen-concentration gas and the low-oxygen-concentration gas, which are supplied from the separator, into the combustion chamber.

4. The gas supply apparatus according to claim 3, further comprising:
- an exhaust gas recirculation device that is adapted to recirculate a portion of exhaust gas, which is outputted from the internal combustion engine, as external EGR gas to the first intake port; and
- a controller that controls the EGR device to supply the external EGR gas to the combustion chamber in addition to the low-oxygen-concentration gas, which is supplied from the separator, into the combustion chamber, when the controller determines that the low-oxygen-concentration gas, which is supplied from the separator into the combustion chamber, becomes insufficient.

5. The gas supply apparatus according to claim 3, wherein:
the supply arrangement includes a first supply passage and a second supply passage that are adapted to supply the low-oxygen-concentration gas and the high-oxygen-concentration gas, respectively, which are produced by the separator, into the combustion chamber;
the first supply passage, which is adapted to supply the low-oxygen-concentration gas, is connected to the second supply passage, which is adapted to supply the high-oxygen-concentration gas, through a communication passage;
a first passage cross-sectional area adjusting device is placed in the communication passage to adjust a passage cross-sectional area of the communication passage;
the second supply passage, which is adapted to supply the high-oxygen-concentration gas, is connected to a passage, which is adapted to supply the fresh air to the separator, though a fresh air supply passage;
a second passage cross-sectional area adjusting device is placed in the fresh air supply passage to adjust a passage cross-sectional area of the fresh air supply passage; and
a controller that drives the first passage cross-sectional area adjusting device to increase the passage cross-sectional area of the communication passage and drives the second passage cross-sectional area adjusting device to increase the passage cross-sectional area of the fresh air supply passage when the controller determines one of the followings:
a load of the internal combustion engine is rapidly increased; and
a load of the internal combustion engine is high.

6. The gas supply apparatus according to claim 1, further comprising a plurality of separators, each of which has a separating member and to each of which the fresh air is supplied, wherein:
- each of the plurality of separators is adapted to supply gas of the fresh air, which is supplied to the separator and is transmitted through the separating member of the separator, as the high-oxygen-concentration gas and to supply the rest of the fresh air, which is other than the high-oxygen-concentration gas, as the low-oxygen-concentration gas;
- the supply arrangement is adapted to supply the high-oxygen-concentration gas and the low-oxygen-concentration gas, which is supplied from each corresponding one of the plurality of separators, into the combustion chamber;
- the gas supply apparatus further comprising a control arrangement that is adapted to adjust a number of separators in use, which are selected from the plurality of separators and are used to produce the high-oxygen-concentration gas and the low-oxygen-concentration gas; and
- the control arrangement increases the number of the separators in use when a load of the internal combustion engine is increased.

7. A gas supply apparatus for an internal combustion engine, which includes a fuel injection valve that is adapted to directly inject fuel into a combustion chamber of the internal combustion engine through at least one fuel injection hole of the fuel injection valve, the gas supply apparatus comprising:
a supply arrangement that is adapted to supply high-oxygen-concentration gas, which has an oxygen concentration that is higher than an oxygen concentration of fresh air, and low-oxygen-concentration gas, which has an oxygen concentration that is lower than the oxygen concentration of the fresh air, into the combustion chamber such that high-level-oxygen-concentration gas, which has an oxygen concentration that is equal to or lower than the oxygen concentration of the high-oxygen concentration gas, and low-level-oxygen-concentration gas, which has an oxygen concentration that is lower than the oxygen concentration of the high-level-oxygen-concentration gas and is equal to or higher than the oxygen concentration of the low-oxygen-concentration gas, are formed from the high-oxygen-concentration gas and the low-oxygen-concentration gas in the combustion chamber, wherein:
the low-level-oxygen-concentration gas is located in a surrounding area, which is adjacent to and surrounds the at least one fuel injection hole of the fuel injection valve in the combustion chamber, and the high-level-oxygen-concentration gas is located in an outer area, which is on an outer side of the surrounding area, in which the low-level-oxygen-concentration gas is located;
the supply arrangement includes a first intake port and a second intake port, which are adapted to supply the low-oxygen-concentration gas and the high-oxygen-concentration gas, respectively, into the combustion chamber;

the first intake port is adapted to supply the low-oxygen-concentration gas into a center region of the combustion chamber, in which a central axis of the combustion chamber is located and which extends in a direction of the central axis;

the second intake port is adapted to supply the high-oxygen-concentration gas into an outer peripheral region of the combustion chamber, which is located on an outer side of the center region and is other than the center region;

the gas supply apparatus further comprises an interrupt-supply device that is adapted to supply the high-oxygen-concentration gas into the first intake port to supply the high-oxygen-concentration gas into the combustion chamber through the first intake port before a time of supplying the low-oxygen-concentration gas into the combustion chamber through the first intake port.

8. The gas supply apparatus according to claim 7, wherein:
the interrupt-supply device is adapted to inject the high-oxygen-concentration gas into a portion of the first intake port;
the gas supply apparatus further comprising:
   a passage cross-sectional area adjusting device that is adapted to adjust a passage cross-sectional area of an upstream side portion of the first intake port, which is located on an upstream side of the portion of the first intake port, into which the high-oxygen-concentration gas is injected from the interrupt-supply device; and
   a controller that controls the passage cross-sectional area adjusting device and the interrupt-supply device; and
the controller drives the passage cross-sectional area adjusting device to reduce the passage cross-sectional area of the upstream side portion of the first intake port and drives the interrupt-supply device to inject the high-oxygen-concentration gas during a valve closing period of an intake valve, during which the intake valve closes the first intake port.

9. The gas supply apparatus according to claim 7, further comprising a separator, which has a separating member and to which the fresh air is supplied, wherein:
the separator is adapted to supply gas of the fresh air, which is supplied to the separator and is transmitted through the separating member of the separator, as the high-oxygen-concentration gas and to supply the rest of the fresh air, which is other than the high-oxygen-concentration gas, as the low-oxygen-concentration gas; and
the supply arrangement is adapted to supply the high-oxygen-concentration gas and the low-oxygen-concentration gas, which are supplied from the separator, into the combustion chamber.

10. The gas supply apparatus according to claim 9, further comprising:
an exhaust gas recirculation device that is adapted to recirculate a portion of exhaust gas, which is outputted from the internal combustion engine, as external EGR gas to the first intake port; and
a controller that controls the EGR device to supply the external EGR gas to the combustion chamber in addition to the low-oxygen-concentration gas, which is supplied from the separator, into the combustion chamber, when the controller determines that the low-oxygen-concentration gas, which is supplied from the separator into the combustion chamber, becomes insufficient.

11. The gas supply apparatus according to claim 9, wherein:
the supply arrangement includes a first supply passage and a second supply passage that are adapted to supply the low-oxygen-concentration gas and the high-oxygen-concentration gas, respectively, which are produced by the separator, into the combustion chamber;
the first supply passage, which is adapted to supply the low-oxygen-concentration gas, is connected to the second supply passage, which is adapted to supply the high-oxygen-concentration gas, through a communication passage;
a first passage cross-sectional area adjusting device is placed in the communication passage to adjust a passage cross-sectional area of the communication passage;
the second supply passage, which is adapted to supply the high-oxygen-concentration gas, is connected to a passage, which is adapted to supply the fresh air to the separator, though a fresh air supply passage;
a second passage cross-sectional area adjusting device is placed in the fresh air supply passage to adjust a passage cross-sectional area of the fresh air supply passage; and
a controller that drives the first passage cross-sectional area adjusting device to increase the passage cross-sectional area of the communication passage and drives the second passage cross-sectional area adjusting device to increase the passage cross-sectional area of the fresh air supply passage when the controller determines one of the followings:
a load of the internal combustion engine is rapidly increased; and
a load of the internal combustion engine is high.

12. The gas supply apparatus according to claim 7, further comprising a plurality of separators, each of which has a separating member and to each of which the fresh air is supplied, wherein:
each of the plurality of separators is adapted to supply gas of the fresh air, which is supplied to the separator and is transmitted through the separating member of the separator, as the high-oxygen-concentration gas and to supply the rest of the fresh air, which is other than the high-oxygen-concentration gas, as the low-oxygen-concentration gas;
the supply arrangement is adapted to supply the high-oxygen-concentration gas and the low-oxygen-concentration gas, which is supplied from each corresponding one of the plurality of separators, into the combustion chamber;
the gas supply apparatus further comprising a control arrangement that is adapted to adjust a number of separators in use, which are selected from the plurality of separators and are used to produce the high-oxygen-concentration gas and the low-oxygen-concentration gas; and
the control arrangement increases the number of the separators in use when a load of the internal combustion engine is increased.

\* \* \* \* \*